United States Patent [19]

Okawa et al.

[11] Patent Number: 4,858,155
[45] Date of Patent: Aug. 15, 1989

[54] REACTION TEMPERATURE CONTROL SYSTEM

[75] Inventors: Dobson Okawa, Anaheim; Wing S. Pang, West Covina; Dang Ngo, Cypress; George Shibata, Chino, all of Calif.

[73] Assignee: Beckman Instruments, Inc., Fullerton, Calif.

[21] Appl. No.: 813,028

[22] Filed: Dec. 24, 1985

[51] Int. Cl.⁴ .................. G01K 15/00; G01K 7/02
[52] U.S. Cl. .................. 364/557; 364/550; 422/63; 422/67; 374/11; 374/112; 236/1 C
[58] Field of Search ........... 364/550, 497, 557, 496; 236/91 C, 1 C, 101 B; 374/11, 45, 110, 112, 166; 422/63, 67, 109

[56] References Cited

U.S. PATENT DOCUMENTS

| | | | |
|---|---|---|---|
| 3,229,754 | 1/1966 | Hoag | 422/109 |
| 3,616,264 | 10/1971 | Ray et al. | 195/127 |
| 4,067,383 | 1/1978 | Padden | 236/1 C |
| 4,086,061 | 4/1978 | Hoffa et al. | 23/259 |
| 4,249,908 | 2/1981 | Funk | 364/557 |
| 4,288,854 | 9/1981 | Burroughs | 364/557 |
| 4,324,285 | 4/1982 | Henderson | 374/45 |
| 4,488,239 | 12/1984 | Agarwal | 364/557 |
| 4,491,924 | 1/1985 | Agarwal | 364/557 |
| 4,504,010 | 3/1985 | Sukimoto et al. | 364/557 |
| 4,518,700 | 5/1985 | Stephens | 436/52 |
| 4,539,295 | 9/1985 | Blough, Jr. | 436/34 |
| 4,575,806 | 3/1986 | Aldrich et al. | 364/557 |
| 4,586,149 | 4/1986 | Stillman et al. | 364/557 |

*Primary Examiner*—Parshotam S. Lall
*Assistant Examiner*—V. N. Trans
*Attorney, Agent, or Firm*—William H. May; Arnold Grant; Gary T. Hampson

[57] ABSTRACT

Apparatus for controlling reaction temperatures in a chemical analyzer comprises a thermoelectric element operating in response to a temperature sensor, and control means capable of predicting a setpoint deviation for a future time period, and, when an overshoot is predicted, reducing a control signal for the element by an amount proportional to a current setpoint deviation. The apparatus includes at least one reaction cell and a buffer unit for thermally stabilizing a fluid that is fed, on demand, into the reaction cell, the cell and the buffer unit having separate thermoelectric elements and sensors. A microcomputer control system generates independent control signals for the elements.

11 Claims, 4 Drawing Sheets

REACTION TEMPERATURE CONTROL SYSTEM

BACKGROUND

The present invention relates to temperature control systems, and more particularly to fluid temperature control and chemical reaction analyzers and the like.

In chemical reaction analyzers it is essential to maintain precise temperature control of the chemical reactions. In some analyzers, it is also required that a substantial quantity of fluid be fed into a reaction test cell, the fluid being introduced at the same temperature as the cell and its contents for preventing fluctuations in the cell temperature when the fluid is introduced. Further, the temperature control of a plurality of reaction cells is often required in a single analyzer.

Thus there is a need for a temperature control system that precisely controls the temperature of a plurality of reaction cells while simultaneously controlling the temperature of a liquid that is to be fed, on demand, into one of the cells without upsetting the temperature of the receiving cell.

SUMMARY

The present invention is directed to a temperature control system that meets this need. The system includes a thermoelectric element coupled to a reaction cell, power means for variable bidirectional electrical drive of the element for selectively heating and cooling the cell in response to a control signal, sensor means for measuring the temperature of the cell, and control means for generating the control signal in response to the sensor means.

In one embodiment, the control means has a first operational mode for driving the measured temperature to within a coarse temperature range. The control means also has a second mode in which a predicted temperature signal is generated, the second mode additionally changing the control signal by an amount proportional to the difference between the measured temperature and the desired temperature according to a comparison between the predicted temperature and the desired temperature. The control means has a further third mode for maintaining the desired temperature by limiting the rate of change of the control signal.

In another embodiment, the system includes buffer means for controlling the temperature of the liquid before the liquid enters the cell, and ambient sensor means for measuring ambient thermal loading, the control means compensating the buffer means in response to the ambient sensor means.

DRAWINGS

These and other features, aspects, and advantages of the present invention will become better understood with reference to the following description, appended claims, and accompanying drawings where:

DESCRIPTION

Figure 1:
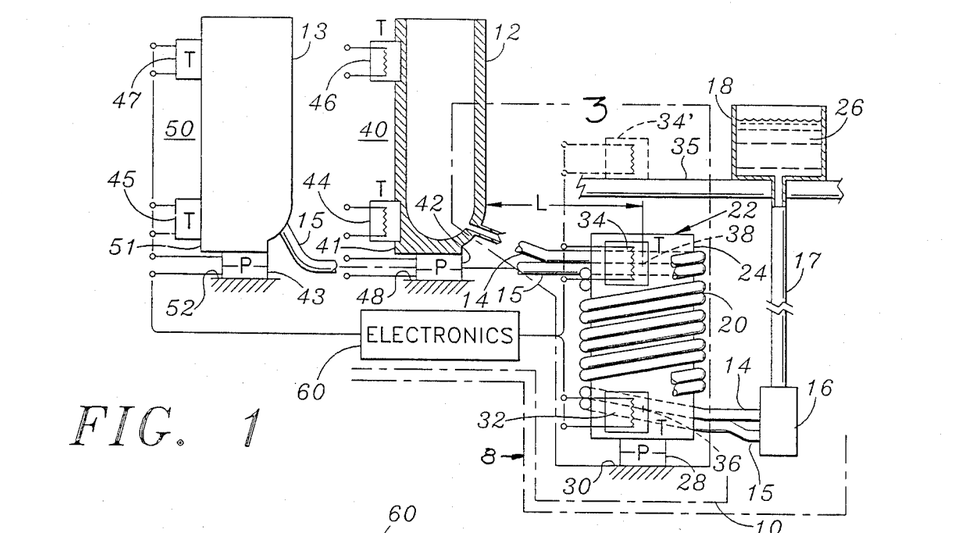
FIG. 1 is a fragmentary sectional elevational view of apparatus according to the present invention.

The present invention is directed to a temperature control system for a chemical reaction analyzer. With reference to FIG. 1, a reaction analyzer 8 having a temperature control system 10 includes primary and secondary cells for conducting chemical reactions, designated primary reactor 12 and secondary reactor 13, the reactors 12 and 13 being connected by respective conduits 14 and 15 to metering valve means 16. The metering valve means 16 is connected by a tube 17 to a reservoir 18.

A portion of the conduits 14 and 15 form a bifilar coil 20 of a buffer or incubator unit 22, the coil 20 being attached with close thermal coupling to an aluminum slug 24 for equalizing the temperature of the coil 20. The metering valve means 16 is capable, by means not shown, of feeding, on demand, a selected volume of a feed fluid 26 from the reservoir 18 into the primary reactor 12 and/or the secondary reactor 13. The purpose of the incubator unit 22 is to conform the temperature of the feed fluid 26 to a desired temperature prior to passage into the respective reactors 12 and 13. The coil 20 is appropriately sized for holding at least the greatest selectable volume of the fluid to be delivered from the metering valve means 16 to the respective conduits 14 and 15. Thus the entire volume of the feed fluid 26 that enters each of the reactors 12 and 13 incubates in the coil 20 for a finite period of time between successive demand feedings thereof. The analyzer 8 also has means, not shown, for draining the reactors 12 and 13.

The slug 24 of the incubator unit 22 is attached to a thermoelectric element 28, the element 28 being thermally bonded on opposite sides thereof to a heat sink 30 (schematically shown) and the slug 24. The element 28 comprises dissimilar conductors, such as antimony and bismuth, having a high Peltier electromotive force (voltage) for selectively heating and cooling the slug 24 in response to a corresponding direction of current in the element 28. It should be understood that the heat sink 30 is capable of carrying heat from an external source into the element 28 during heating of the slug 24, as well as carrying heat out of the element 28 during cooling of the slug 24.

A temperature measuring first sensor 32 is bonded to the slug 24 at a location proximate the element 28 for providing a short response time between a change in the temperature of the slug 24 at the element 28 and a corresponding electrical response in the first sensor 32. The first sensor 32 is a conventional thermistor or other suitable device.

A second temperature measuring sensor 34 is provided for permitting control compensation, described below, responsive to ambient thermal loading. In one version of the present invention, shown in FIG. 1, the second sensor 34 is bonded to the slug 24 at a location distant from the element 28 for measuring a temperature gradient in the slug 24.

The first sensor 32 and the second sensor 34 are located proximate to opposite ends of the coil 20, the first sensor (and the element 28) being associated with an entrance end 36 of the coil 20, the second sensor being associated with an exit end 38 of the coil 20. Thus the feed fluid 26 enters the coil 20 at a location proximate to the element 28 for relatively direct, rapid heat conductivity between the entering feed fluid 26 and the element 28. During progress of the feed fluid 26 through the coil 20, the temperature of the feed fluid 26 becomes more or less equalized with the temperature of the slug 24 such that by the time the feed fluid 26 arrives at the exit end 38 of the coil 20, there is little, if any, heat transfer between the feed fluid 26 and the slug 24.

It should be understood that the relative positions of the reactors 12 and 13, and the coil 20 are arbitrary in FIG. 1, for clarity. For example, a terminal portion 37 of the conduit 14, having a length L between the primary reactor 12 and the exit end 38 of the coil 20, is not necessarily different in length than a corresponding portion of the conduit 15.

In an alternative embodiment of the present invention, the second sensor, designated second sensor 34' in FIG. 1, is relocated on a frame member 35 of the reaction analyzer 8. The purpose of relocating the second sensor 34' is to overcome ambient loading of the terminal portion 37 of the conduit 14 (or conduit 15) between the exit end 38 of the coil 20 and the primary reactor 12 (or secondary reactor 13). In practical versions of the analyzer 8, the length L can be up to approximately one foot. Thus ambient loading of the terminal portion 37 is a significant problem, especially when there is a large difference between the ambient temperature and a desired reaction temperature. The location of the second sensor 34' is selected for providing a response to ambient temperature changes that approximates the ambient loading of the terminal portion 37 and, to some degree, the exit end 38 of the coil 20. The second sensor 34' may be coupled directly to the terminal portion 37; however, it is expected that temperature fluctuations of the terminal portion 37 during the demand feeding of the feed fluid 26 would unduly complicate the required compensation.

Figure 3:
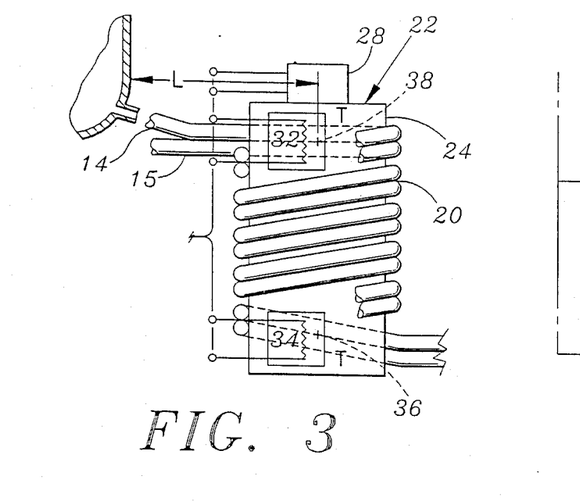
FIG. 3 is a fragmentary elevational view of an alternative configuration of the apparatus of FIG. 1 within region 3 in FIG. 1.

In a further version, shown in FIG. 3, the element 28 is relocated on the slug 24 proximate to the exit end 38 of the coil 20. Thus the feed fluid 26, to the extent that there is a temperature gradient in the slug 24, is "preequalized", then increasingly close-coupled to the temperature of the element 28 as the feed fluid 26 approaches the exit end 38 of the coil 20. Correspondingly, the first sensor 32 is relocated proximate the element 28 and the exit end 38 of the coil 20, and the second sensor 34 is relocated proximate the entrance end 36 of the coil 20.

The primary reactor 12, shown schematically in FIG. 1, includes a cell body 40, a base 41 of the cell body 40 being equipped with a thermoelectric element for heating and cooling the reactor 12, the element being designated element 42. The element 42 is attached to a heat sink 48 as described above in connection with the incubator unit 22. Similarly, the primary reactor 12 is equipped with a first sensor 44 at the base 41 and a second sensor 46 at a location remote from the base 41 for electrically monitoring respective temperatures of the cell body 40.

Correspondingly, the secondary reactor 13 includes a cell body 50, a base 51 of the cell body 50 being equipped with a thermoelectric element 43 for heating and cooling the reactor 13. Similarly, the element 43 is attached to a heat sink 52 as described above in connection with the incubator unit 22. Also, the secondary reactor 13 has a first sensor 45 at the base 51 and a second sensor 47 located remote from the base 51 thereof.

In alternative versions of the present invention, one or more of the second sensors 34, 46, and/or 47, is omitted, for a reduction in cost and complexity of the system.

The elements 28, 42, 43, and the sensors 32, 34, and 44–47, are connected to control electronics 60. Although the electronics 60 may be implemented in various ways, it is expedient to incorporate a programmable element such as a computer for a high degree of control flexibility and reduced hardware development costs. Accordingly, the following description is based on a microcomputer implementation of electronics 60.

Figure 2:
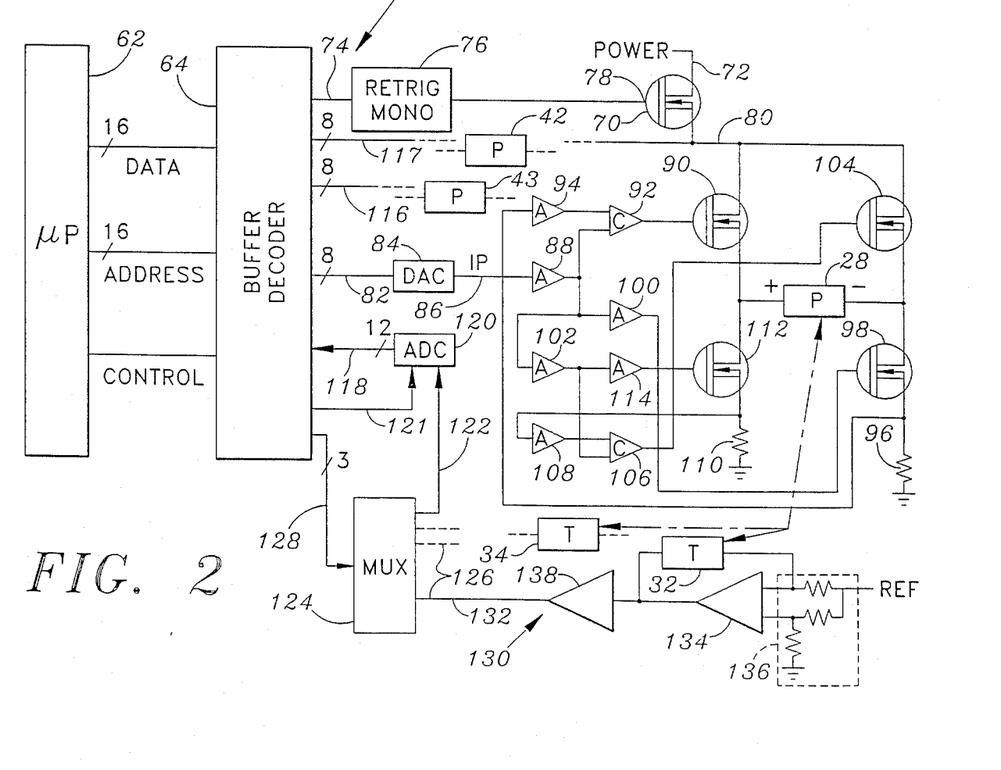
FIG. 2 is a fragmentary schematic diagram of the apparatus of FIG. 1.

With further reference to FIG. 2, the element 28, and the first and second sensors 32 and 34 of the incubator unit 22 are connected in the electronics 60. The elements 42 and 43, and the sensors 44–47 are also connected to corresponding circuits, not shown, of the electronics 60. The electronics 60 includes a microprocessor 62 and a buffer-decoder interface 64 for transmitting data and timing signals into and out of the microprocessor 62.

The microprocessor 62 incorporates appropriate memory circuits, both programmable and non-volatile (not shown) for storing and executing a temperature control program as further described below. As shown in FIG. 2, the microprocessor 62 provides 16 data lines, 16 address lines, and a plurality of control lines for use by the interface 64, the microprocessor 62 comprising commercially available circuits that are known to those skilled in the art. For example, an "8001" microprocessor circuit suitable for use in the present invention is available from Zilog Corporation, Campbell, Calif.

The electronics 60 is connected by a semiconductor device or power switch 70 to a source of DC power 72 for enabling operation of the element 28 when the control program of the microprocessor 62 is operating. For this purpose, a "heartbeat" signal 74 is decoded and received from the microprocessor 62 and directed to a retriggerable monostable multivibrator 76 by the interface 64. The multivibrator 76 is connected for controlling a gate 78 of the switch 70, turning the switch 70 "on" when the multivibrator is triggered by the heart beat signal 74. As long as the heart beat signal 74 keeps retriggering the multivibrator 76 under program control, the switch 72 remains on, connecting the power 72 to a switched power bus 80.

The interface 64 decodes and directs an incubator current byte 82 from the microprocessor 62 to a digital to analog converter, designated DAC 84, for producing a corresponding analog current signal 86. The current signal 86, buffered by an operational amplifier 88, drives another switch designated "PosCool" switch 90 through a comparator 92, the comparator 92 being referenced by an amplifier to a current sensing resistor, designated positive resistor 96 for limiting a positive or cooling current in the element 28. The positive resistor 96 is connected between ground and a "CoolGnd" switch 98 for sinking the cooling current to ground through the positive resistor 96. The CoolGnd switch 98 is directly controlled from the amplifier 88 through an amplifier 100, the CoolGnd switch 98 being on whenever the current byte 82 is positive.

It should be understood that the current byte 82 is a "two's compliment" number having a range of from −127 to +127. Thus, when the current byte 82 is positive, the element 28 cools the incubator unit 22 at a rate proportional to the magnitude of the current byte 82.

The amplifier 88 also drives an inverting amplifier 102 for producing a negative or heating current in the element 28 as described herein. The inverting amplifier 102 drives another switch, designated "PosHeat" switch 104, through a comparator 106, the comparator 106 being referenced by an amplifier 108 to a current sensing resistor, designated negative resistor 110, for limiting a negative or heating current in the element 28. The negative resistor 110 is connected between ground and a "HeatGnd" switch 112 for sinking the heating current to ground through the negative resistor 110. The HeatGnd switch 112 is directly controlled from the inverting amplifier 102 through an amplifier 114, the HeatGnd switch 112 being on whenever the current byte 82 is negative. Thus, when the current byte 82 is negative, the element 28 heats the incubator unit 22 at a rate proportional to the magnitude of the current byte 82.

In a similar manner, the elements 42 and 43 are connected for heating and cooling the respective primary and secondary reactors 12 and 13 in response to a primary current byte 116 and a secondary current byte 117 by other circuits (not shown) as described above.

The interface 64 also communicates to the microprocessor 62 a twelve-bit temperature word 118 from an analog to digital converter or ADC 120, the ADC 120 being controlled by a converter signal 121 from the interface 64. The ADC 120 receives an analog temperature signal 122 from an analog multiplexer or MUX 124.

The MUX 124 receives a plurality of input signals 126, producing the analog temperature signal 122 from a selected one of the input signals 126 as defined by a three-bit select code 128 from the interface 64.

The first sensor 32 is connected in a sensor circuit 130 for producing a first sensor signal 132 corresponding to a measured temperature of the slug 24 proximate to the entrance end 36 of the coil 20. The sensor circuit 130 includes an operational amplifier 134 having the sensor 32 connected as a feedback element, a reference network 136 supplying an offset current for producing variable output voltage responsive to a changing resistance of the first sensor 32. The amplifier 134 drives a buffer 138 for isolating the first sensor signal 132 from the first sensor 32.

Similarly, the second sensor 34 is connected in a sensor circuit (not shown) for producing another of the input signals 126 for the MUX 124. Further, other sensor circuits (not shown) are provided for the first and second sensors 44, 45, 46, and 47 of the primary and secondary reactors 12 and 13, each of the circuits providing another of the input signals 126 for the MUX 124.

The temperature control program of the microprocessor 62 interacts with the interface 64 for sampling the input signals 126 from the sensors 32, 34, and 44–47. The program appropriately generates the incubator, primary, and secondary current bytes 82, 116, and 117 for driving the thermoelectric elements 28, 42 and 43 for controlling the temperature of the primary and secondary reaction cells 12 and 13.

Figure 4A:
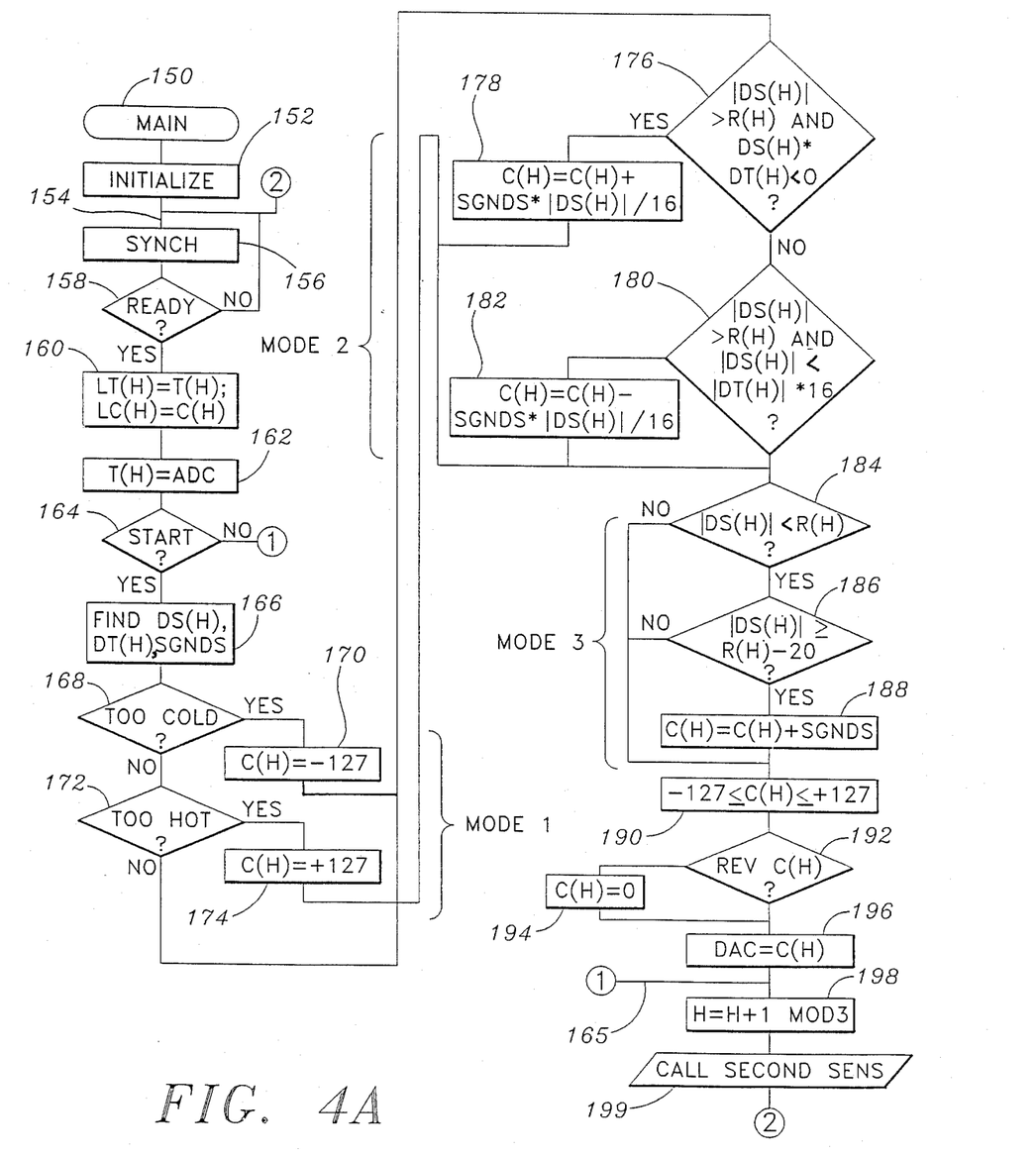
FIG. 4 is a computer flow diagram for the apparatus of FIG. 1.
Figure 4B:
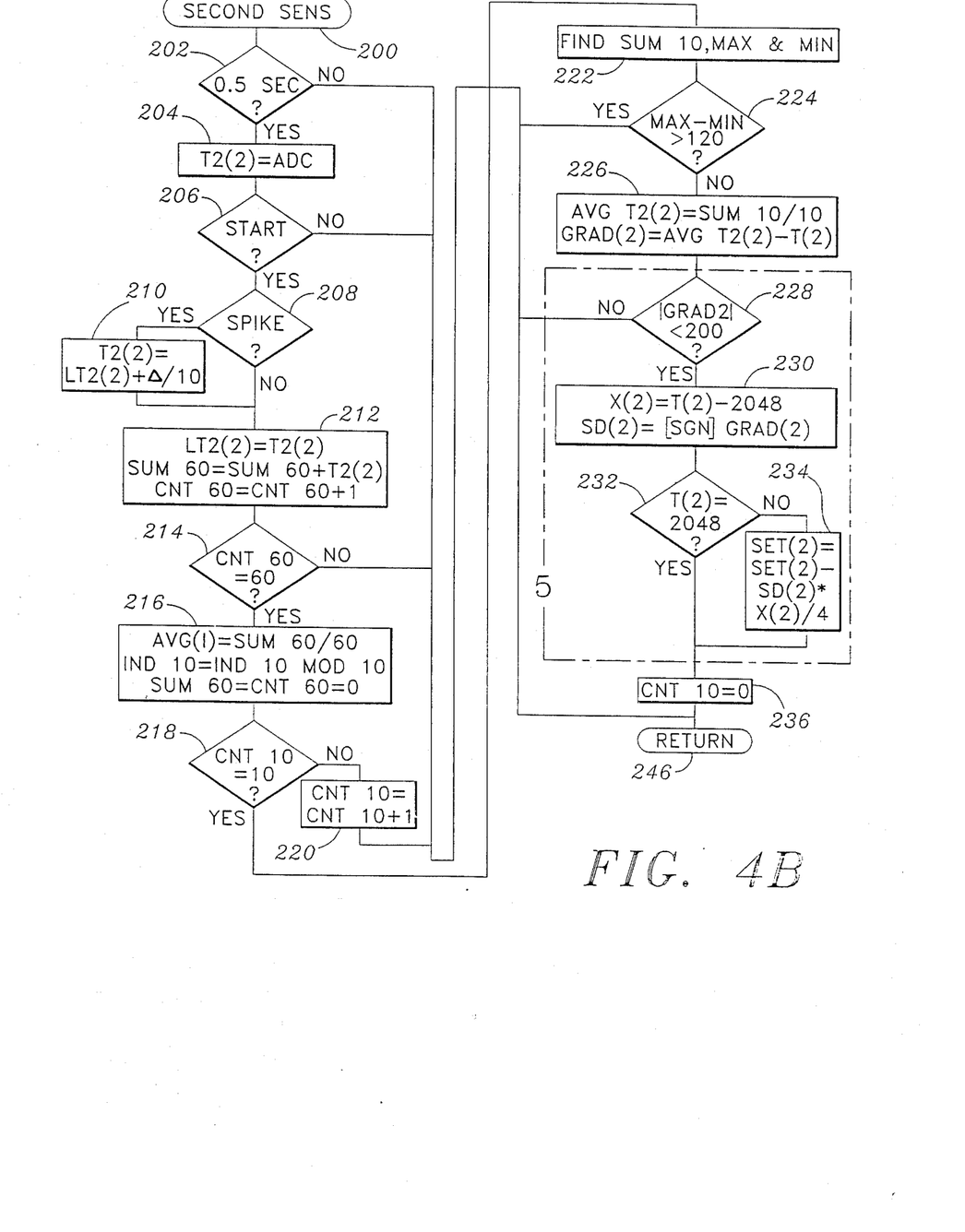

With further reference to FIG. 4, the program communicates with the interface 64 at intervals of 20 ms for successively controlling the primary reactor 12, the incubator unit 22, and the secondary reactor 13. Thus the program operates at a sample interval of 60 ms. The program, implemented in the conventional Pascal programming language, also permits other analyzer operations by further means, not shown.

For example, the 3-bit MUX signal 124 and the heartbeat signal 74 are combined and sent from the microprocessor 62 to the interface 64 as a single byte of data, the program alternately complementing the corresponding heartbeat bit every 20 ms for keeping the power switch 70 on while the program runs as described above.

The program, as shown in FIG. 4, omits provisions for the second sensors 46 and 47 of the primary and secondary reactors 12 and 13. Based on FIG. 4 and the description herein, instatement of these provisions is within the skill of ordinary programmers.

The program, beginning at MAIN 150, performs an INIT 152 step for setting variables to appropriate initial values and, from a reentry point 154, enters a WAIT 156 step for synchronization with an interrupt timer, not shown, the reentry point being encountered every 20 milliseconds (ms). In successive reentries, the program is directed to the primary reactor 12, the incubator unit 22, and the secondary reactor 13, by a channel index H having respective values 1–3. Thus the program controls each of the elements 28, 42 and 43, at intervals of 60 ms.

Following WAIT 156, an INITEST 158 step tests whether other initialization, not shown, has been accomplished. If not, control is transferred to the reentry point 154; otherwise, a SAVE 160 step temporarily stores previous values of T[H] and C[H], described herein, as LT[H] and LC[H]. Next, a READ 162 step interrogates the ADC 120, storing a new value of T[H]. T[H] corresponds to the measured temperature from the temperature word 118 of the respective first sensor 32, 44, or 45. In the program, temperature values range from zero, corresponding to about 32° C., to 4095, corresponding to about 22° C. The desired temperature nominally has a value of 2048, corresponding to approximately 27° C. Thus a change of one degree centigrade is represented by about 409.5 temperature value increments. For simplicity in the following discussion, temperature is treated as synonomous with temperature value.

Once T[H] has been obtained, a STARTEST 164 step tests whether control operation, by means not shown, has been started. If not, control is transferred to an exit point 165 for indexing the next channel (H) and calling a SECONDSENS 200 procedure described herein. Otherwise, a SAVE 166 step computes and temporarily stores a deviation value DS[H], a rate value DT[H], and a direction value SGNDS. DS[H] is the difference between a setpoint or desired temperature SET[H] and the measured temperature T[H]. DT[H] is the difference between the measured temperature T[H] and the most recent previously measured temperature LT[H]. SGNDS is set to −1 unless DS[H] is greater than zero, in which case it is set to +1.

Based on the above, the program computes a control signal current value C[H] for producing the corresponding current byte 82, 116, or 117, for each of the elements 28, 42 and 43. In a first mode of operation, when T[H] is outside a coarse temperature range of 2 to 4093, the associated C[H] is driven to a maximum control level for full current operation of the associated thermoelectric element 28, 42 or 43. Thus a COLDTEST 168 step tests whether T[H] is greater than 4093, in which case C[H] is set by a MAXNEG 170 step to −127, the maximum negative value for the current byte 82; otherwise, a HOTEST 172 step tests whether T[H] is less than 2, in which case C[H] is set by a MAXPOS 174 step to +127, the maximum positive value for the current byte 82.

In a second mode of operation, when the first mode is inactive and DS[H] is outside a fine range R[H] that defines a third mode of operation, if the magnetude of DS[H] is increasing, then C[H] is increased algebraically by the product of SGNDS and one-sixteenth the magnetude of DS[H], otherwise, if the magnetude of DS[H] is less than sixteen times the magnetude of DT[H], then C[H] is decreased algebraically by the product of SGNDS and one-sixteenth the magnetude of DS[H]. In this second mode, sixteen times the magnetude of DT[H] represents a predicted temperature change magnetude over a time period of sixteen 60 ms time intervals, or about one second. The comparison with DS[H] is effectively a prediction of whether the measured temperature will overshoot the desired temperature after a period of about one second. Thus the second mode changes the control signal in response to the predicted temperature comparison.

In particular, as further shown in FIG. 4, a negative outcome of HOTEST 172, the first mode being inactive, transfers control to a DECTEST 176 step that tests whether the magnetude of DS[H] is greater than R[H], the fine range of the third mode of operation, and whether the product of DS[H] and DT[H] is less than zero. If so, the magnetude of DS[H] is increasing, T[H] moving away from SET[H]. (If DS[H] is positive and DT[H] is negative, or vice versa.) Thus an INCREASE 178 step changes C[H] by algebraically adding the product of SGNDS and one-sixteenth the magnetude of DS[H] to C[H]. If the result of DECTEST 176 is negative, a PREDICT 180 step tests whether the magnetude of DS[H] is greater than R[H] and the magnetude of DS[H] is less than sixteen times the magnetude of DT[H]. If so, a predicted overshoot condition exists, DS[H] decreasing so fast that T[H] would, at the present rate of DT[H], pass through SET[H] within sixteen time intervals. Thus a DECREASE 182 step changes C[H] by algebraically subtracting the product of SGNDS and one-sixteenth the magnetude of DS[H] from C[H].

By changing C[H] by an amount proportional to DS[H], rather than by a "predicted DS" based on the predicted temperature change, the second mode advantageously combines a high degree of control stability with quick response.

In a third mode, when neither of the first two modes is active and the magnetude of DS[H] is less than R[H], if DS[H] is less than 20 of R[H], C[H] is not changed. Otherwise, C[H] is incremented by one in a direction for decreasing the magnetude of DS[H]. Thus, as shown in FIG. 4, control is transferred from the MAXNEG 170, the MAXPOS 174, the INCREASE 178, the DECREASE 182 and the PREDICT 180 (when its outcome is negative) steps to a RANGETEST 184 step for testing whether the magnetude of DS[H] is less than R[H]. If so, a SUBRNGTEST 186 step tests whether the magnetude of DS[H] is within 20 of R[H], in which case an INCREMENT 188 step changes C[H] by the value of SGNDS, one count only in a direction for decreasing the magnetude of DS[H]. Otherwise, C[H] is not changed, DS[H] being sufficiently within R[H] that the control signal need not be changed.

Control is transferred, following the INCREMENT 188 and the RANGETEST 184 (when its outcome is negative) steps, to a CLAMP 190 step for forcing C[H] to a magnetude of 127, when it otherwise would fall outside of that range, without changing its polarity. Next, a DIRTEST 192 step tests whether the polarity of C[H] is opposite the polarity of LC[H] (C[H] and LC[H] being both non-zero), in which case a PAUSE 194 step sets C[H] equal to zero. Thus the program prevents sudden changes in the direction of C[H] by forcing C[H] to zero in any interval that would otherwise produce successive nonzero values not of the same polarity.

After the DIRTEST 192 (or PAUSE 194), an OUTPUT 196 step sends C[H] to the interface 64 for generating the appropriate current byte 82, 116, or 117, then an INDEX 194 step points H the next control channel, and a CALL 196 step invokes the procedure SECONDSENS 200, described below. Finally, control is transferred to the reentry point 154 and the process is repeated as described above.

The procedure SECONDSENS 200, invoked by CALL 196 as described above, compensates SET[2], the desired temperature of the first sensor 32. SECONDSENS 200 averages, at half-second intervals, 60 samples of the temperature word 118 from the second sensor 34 over a 30 second interval, the ten most recent such averages, if within a predetermined stable range, are averaged as a five-minute running average and, if a gradient between the sensors is sufficiently small, a settled condition of the incubator 22 is identified. When the settled condition is identified, if SET[2] is not equal to the running average, the difference between T2 and a setpoint constant SETC2 (2048) is scaled and used to adjust SET[2] in a direction dependent on the difference between the average and T[2], the measured temperature of the first sensor 32.

After the settled condition of the incubator unit 22 is detected, SECONDSENS 200 continues to update the ten averages, but the settled condition is not tested until after another five minute time period. Accordingly, the desired temperature of the first sensor is never adjusted twice in any five minute period. Thus the program responds quickly to a settled condition, yet the adjustments are sufficiently spaced in time that the short term control dynamics are affected only slightly, if at all.

In particular, with continued reference to FIG. 4, SECONDSENS 200 first performs a HALFTEST 202 step for testing whether a time period of 0.5 second (25 of the 60 ms intervals) has elapsed. If not, a RETURN 246 step increments a counter for the 60 ms intervals and transfers control to the reentry point 154; otherwise, a READ 204 step resets the intervals counter and interrogates the ADC 120, storing a new value of T2[2]. T2[2] corresponds to the measured temperature from the temperature word 118 of the second sensor 34.

Next, a STARTEST 206 Step tests whether the control operation has been started, as in STARTEST 164. If not, control is transferred to the RETURN 246 Step; otherwise, a SPIKETEST 208 Step tests whether T2[2] differs from the most recent previous T2[2], LT2[2], LT2[2] being non-zero, by more than a predetermined amount (60). If so, a CUTSPIKE 210 Step replaces T2[2] with the algebraic sum of LT2[2] and one tenth the difference between T2[2] and LT2[2] for filtering noise from the successive values of T2[2].

Following the CUTSPIKE 210 and SPIKETEST 208 (if negative) Steps, an ACCUM60 212 Step saves T2[2] as a new value of LT2[2], adds T2[2] to a total, SUM60, and increments a counter, CNT60. Next, a TEST60 214 Step tests whether CNT60 has reached a value of 60. If not, control is transferred to the RETURN 246 Step; otherwise an AVG60 216 Step saves one-sixtieth of SUM60 as AVG(I) in an array of the ten most recent values. AVG60 216 also increments, modulo-10, an index IND10, and clears SUM60 and CNT60. Next, a TENTEST 218 step tests a half-minute counter, CNT10, for overflow. If none, a COUNT 220 step increments CNT10 and passes control to the RETURN 246 step; otherwise, a RANGE 222 step is performed for finding the total, maximum and minimum values, SUM10, MAX10 and MIN10 of the array.

After the RANGE 222 step, a RANGETEST 224 step tests whether MAX10 is more than a predetermined amount (120) greater than MIN10, in which case control is transferred to the RETURN 246 step. Otherwise, a GRAD 226 step saves one-tenth of SUM10 as AVGT2[2], a running five-minute average, and saves as GRAD[2] the difference between AVGT2[2] and T[2], the measured temperature of the first sensor 32. Then, a GRADTEST 228 step tests whether the magnetude of GRAD[2] is less than a predetermined amount (200). If not, control is transferred to the RETURN 246 step; otherwise, a "settled condition" of the incubator unit 22 is established, in which a SAVE 230 step computes and temporarily stores an incubator deviation X[2] and a deviation direction SD[2]. X[2] is the difference between T[2] and the nominal set point (2048). SD[2] is set to $-1$ unless GRAD[2] is greater than zero, in which case it is set to $+1$.

Next, following the SAVE 230 step, A NOMTEST 232 step tests whether T[2] is at the nominal setpoint, 2048. If not, an ADJUST 234 step changes SET[2] by algebraically subtracting the product of SD[2] and one-fourth X[2] therefrom. Following the ADJUST 234 or the NOMTEST 232 (if positive) steps, a HALFCLR 236 step resets CNT10 so that the "settled condition" is not tested again for five minutes. Finally, control is passed to RETURN 246 for transfer to the reentry point 154 as described above.

Figure 5:
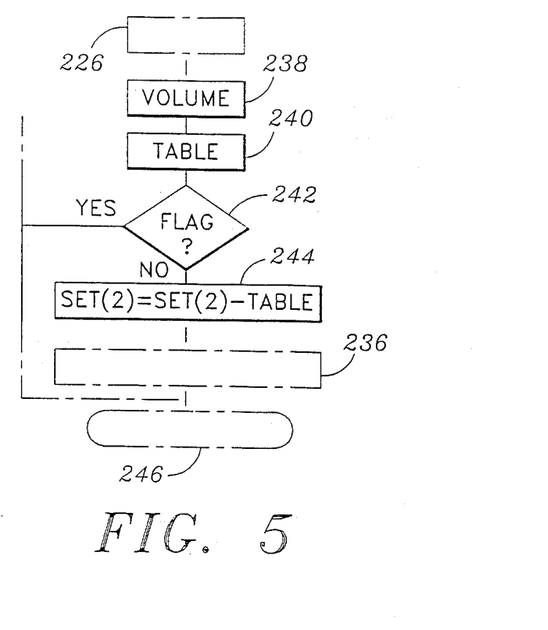
FIG. 5 is a computer flow diagram of an alternative configuration of the diagram of FIG. 4 within region 5 in FIG. 4.

With further reference to FIG. 5, when the second sensor is the relocated sensor 34' as described above, SECONDSENS 200 can be modified according to a further version of the present invention to provide a look-up function for adjusting SET[2]. The steps shown in FIG. 5 replace the TESTGRAD 228, the SAVE 230, the NOMTEST 232, and the ADJUST 234 steps.

Following the GRAD 226 step of FIG. 4, a VOLUME 238 step determines a relative demand volume of the feed fluid 26 that will be fed by the metering valve means 16 in terms of a multiple of the volume within the terminal portion 37 of the conduit 14 (or 15). A LOOK 240 step determines from AVGT2[2] a corresponding temperature gradient between the terminal portion 37 and the primary reactor 12. Data for the LOOK 240 step may be determined imperically by injecting a volume of the feed fluid 26 equal to the volume of the terminal portion 37 and measuring the average temperature of the fluid dispensed into the reactor 12. It should be understood that the data may be tabulated in one or more dimensions, depending on the severity of the ambient loading and the degree of compensation desired. For example, the data can depend on one or more of GRAD2 and T[1-3]. Moreover, the data can be time-varient, being responsive to the time history of the loading. The data also includes a flag value for signalling conditions of excessive thermal stress, based on GRAD2, for example.

Next a LOOKTEST 242 step tests whether the flag value was produced by LOOK 240. If so, control is transferred to the RETURN 246 step; otherwise an ADJUST 244 step changes SET[2] by an amount that would make SET[2] different from the nominal setpoint by an amount equal to the gradient divided by the relative demand volume. Thus if the fluid in the terminal deviates in one direction from the desired temperature, then the incubator is adjusted for a temperature in an opposite direction such that the total mixed volume mixed in the reactor is at the desired temperature.

For example, if the LOOk 240 step yields a gradient of $-1°$ C. and the demand volume is three times the volume of the terminal portion, then SET[2] should be changed to:

$$SET[2] = 2048 - 409.6/(3-1)$$

thus SET[2] is changed by $2048 - (T[2] + 204.8)$.

Figure 6:
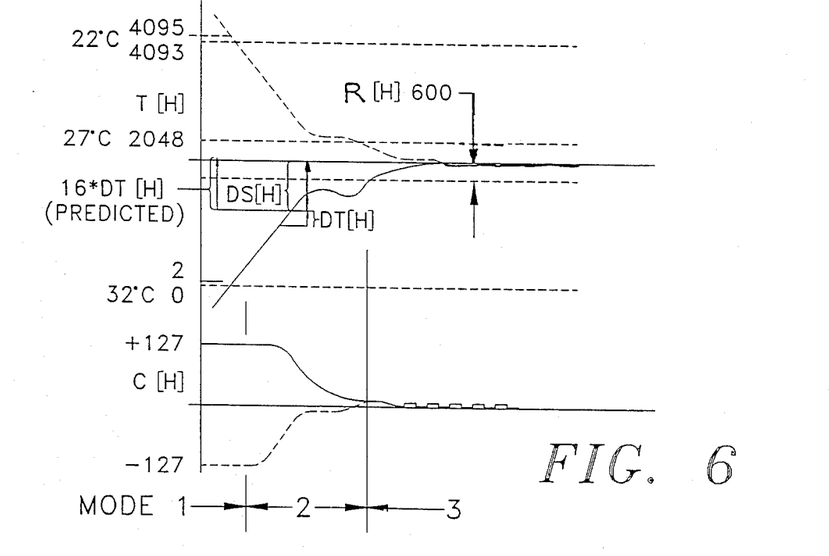
FIG. 6 is a graph showing operation of the apparatus of FIG. 1.

With reference to FIGS. 4 and 6, the first mode of operation commences at a temperature in excess of 32° C., the program generating a full-scale control signal C[H] of $+127$. As the temperature approaches within an active range of T[H], T[H] increasing above 2, the second mode takes over. As shown in FIG. 6, DS[H] is represented by an arrow from the solid temperature curve pointing to the 27° C. ordinate. DT[H] is represented by a corresponding arrow pointing to the curve, illustrating a change in T[H] after 60 ms. Another arrow, depicting 16 times DT[H] as measured from the same point on the curve, shows a predicted temperature change, after 16 of the 60 ms intervals. Because the prediction arrow crosses the 27° C. ordinate, an overshoot is predicted. Accordingly, the control signal C[H] is caused to decrease for stabilizing the temperature at the desired 27° C. As T[H] approaches within 600 units of the desired temperature, the third mode is entered.

In the third mode, the limitation of one unit change at a time in the value of C[H] produces a form of pulse-width modulation. What happens is that C[H] changes between two or more states, remaining in a given state for a variable period of time. Because the response time of the system is slow in comparison with the sample rate, the system responds to an effective average of C[H], this average being of much finer resolution that the 8-bit resolution of the DAC 84. Thus the third mode provides enhances smoothness of operation after the temperature is stabilized.

Although the present invention has been described in considerable detail with reference to certain preferred versions thereof, other versions are possible. For example, a pair of the elements 28 can be coupled to opposite ends of the slug 24 for direct control of a temperature gradient therein. Therefore, the spirit and scope of the appended claims should not necessarily be limited to the description of the preferred versions contained herein.

What is claimed is:

1. A method for controlling a reaction temperature in a chemical analyzer, the method comprising the steps of:
   (a) coupling a thermoelectric element to the reaction in the chemical analyzer;
   (b) sensing a temperature proximate to the element in the chemical analyzer;
   (c) powering the thermoelectric element for heating and cooling the reaction in response to a value of a control signal generated by control means; and (d) generating the control signal by the steps of:
  (i) determining a deviation of the sensed temperature from a desired temperature;
  (ii) selecting from the control means a first control signal value for reducing the deviation;
  (iii) determining a change in the sensed temperature for a first predetermined time interval;
  (iv) determining a predicted change in the sensed temperature for a second predetermined time interval based on the change determined in the first predetermined time interval;
  (v) comparing the deviation with the predicted change; and
  (vi) depending on the result of the comparison, modifying the first control signal value by an amount proportional to the deviation.

2. A method as in claim 1 wherein the step of determining the predicted change includes multiplying the change determined in the first predetermined time interval by a constant.

3. A method as in claim 1 wherein the step of modifying the first control signal valve includes modifying the first control signal valve in a direction that decreases the rate of change of the sensed temperature.

4. A method as in claim 1 wherein the second predetermined time interval is longer than the first predetermined time interval.

5. A method as in claim 4 wherein the second predetermined time interval is at least ten times longer than the first predetermined time interval.

6. A method as in claim 5 wherein the second predetermined time interval is sixteen times longer than the first predetermined time interval.

7. Apparatus for controlling the temperature of a reaction cell comprising:
  (a) a thermoelectric element coupled to the cell;
  (b) power means for variable bipolar electrical drive of the element for selectively heating and cooling the cell in response to a control signal;
  (c) sensor means for producing a sensor signal corresponding to a measured temperature of the cell; and
  (d) control means for generating the control signal in response to the sensor signal, the control means operating in one of the three modes, wherein:
    (i) the first mode is operative when a difference between the measured temperature and a desired temperature is outside a predetermined coarse temperature range, the control means including means for producing a first mode control signal value for driving the measured temperature toward a temperature within the coarse temperature range;
    (ii) the second mode is operative when the first mode is not in operation and the difference between the measured temperature and the desired temperature is greater than a fine temperature range, the control means including means for determining the rate of change of the sensor signal during a first time interval, determining a predicted temperature change of the reaction cell during a second time interval and, if the predicted temperature change is greater than the difference, adjusting the control signal valve by an amount related to the difference to decrease the rate of temperature change; and
    (iii) the third mode is operative when the difference between the measured temperature and the desired temperature is less than the fine temperature range, the control means including means for producing a change in the control signal value only when the measured temperature is within predetermined temperature ranges defined at the limits of the fine temperature range.

8. An apparatus as in claim 7 wherein the control means further includes means operative in the second mode for adjusting the control signal valve to decrease the difference between the measured temperature and the desired temperature when the difference is increasing and for enabling the means for predicting the temperature change when the difference is decreasing.

9. An apparatus as in claim 7 wherein the means operative in the third mode further includes means for varying the control signal valve an amount less than the first mode control signal valve.

10. An apparatus as in claim 9 wherein the control means includes a digital-to-analog converter that generates as an output the control signal valve and digital value means for applying a digital value to the digital-to-analog converter, and the means operative in the third mode includes means for varying digital value means by one digital value unit.

11. Apparatus for controlling the temperature of a reaction cell and an associated reactant inlet conduit, the inlet conduit connecting the cell to a reservoir for selectively admitting controlled amounts of fluid into the cell, the apparatus comprising:
  (a) a buffer unit for the conduit, the buffer unit comprising:
    (i) a thermally conductive block having a length of the conduit in thermal contact therewith, the length of conduit having a first end and a second opposite end separated along a dimension of the block;
    (ii) a buffer thermoelectric element coupled to the block and proximate the first end of the length of conduit; and
    (iii) first sensor means for producing a first sensor signal corresponding to a first measured temperature of the block proximate the first end of the length of conduit and the element;
  (b) a length of the conduit between the second end and the cell being exposed to air at an ambient temperature;
  (c) second sensor means for producing a second sensor signal corresponding to a second measured temperature of the air to which the length of conduit is exposed responsive to thermal loading;
  (c) a cell thermoelectric element coupled to the cell;
  (d) power means for independent variable bipolar electrical drive of the buffer unit element in response to a control signal; and
  (e) control means for generating the control signal in response to the first sensor signal and the second sensor signal for adjusting the temperature of the length of conduit in thermal contact with the block to compensate for thermal variations induced in the length of the conduit between the second end and the cell.

* * * * *